United States Patent
Holmes

(10) Patent No.: US 8,251,849 B2
(45) Date of Patent: Aug. 28, 2012

(54) CLUTCHING METHOD AND MECHANISM FOR ELECTRICALLY VARIABLE TRANSMISSIONS

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 622 days.

(21) Appl. No.: 12/508,275

(22) Filed: Jul. 23, 2009

(65) Prior Publication Data

US 2010/0160103 A1   Jun. 24, 2010

Related U.S. Application Data

(60) Provisional application No. 61/139,348, filed on Dec. 19, 2008.

(51) Int. Cl.
*F16H 3/72* (2006.01)

(52) U.S. Cl. .......................................................... 475/5

(58) Field of Classification Search ............... 192/18 A, 192/48.611, 48.614, 48.618, 85.37; 475/5; 477/3–6; 180/65.21, 65.225, 65.24, 65.245, 180/65.25, 65.26, 65.6

See application file for complete search history.

(56) References Cited

U.S. PATENT DOCUMENTS

| | | | |
|---|---|---|---|
| 6,527,658 B2 | 3/2003 | Holmes et al. | |
| 6,945,894 B2 | 9/2005 | Holmes | |
| 7,169,073 B2 | 1/2007 | Schmidt et al. | |
| 7,169,074 B2 | 1/2007 | Raghavan et al. | |
| 7,261,660 B2 | 8/2007 | Sowul et al. | |
| 7,278,941 B2 | 10/2007 | Holmes et al. | |
| 7,942,781 B2 * | 5/2011 | Kimes | 477/5 |
| 2003/0085062 A1 * | 5/2003 | Bowen | 180/65.1 |
| 2004/0147353 A1 * | 7/2004 | Bowen | 475/5 |

* cited by examiner

*Primary Examiner* — David D Le
*Assistant Examiner* — David J Hlavka

(57) ABSTRACT

An electrically variable transmission includes an input member, an output member, two planetary gear sets, two electric motors, a plurality of coupling members and a plurality of torque transmitting devices. Each of the planetary gear sets includes first, second and third members. The torque transmitting devices include a rotating clutch and a brake. The rotating clutch and the brake share a common fixed connection. The rotating clutch is released by a stationary actuator that engages a rotatable release plate. The actuator is engaged to release the rotating clutch when the brake is engaged.

23 Claims, 3 Drawing Sheets

| TRANSMISSION SELECTION | TORQUE TRANSMITTING DEVICE 26 | TORQUE TRANSMITTING DEVICE 24 | RELEASE BEARING 73 FORCE | RELEASE BEARING 73 SPEED | RELEASE BEARING 73 SPIN LOSS |
|---|---|---|---|---|---|
| LOW M1 | ON | OFF | YES | NO | NO |
| FIXED GEAR | ON | ON | NO | NO | NO |
| HIGH M2 | OFF | ON | NO | YES | NO |
| "eTC" SHIFT | OFF | OFF | YES | YES | YES |

CLUTCHING METHOD AND MECHANISM FOR ELECTRICALLY VARIABLE TRANSMISSIONS

CROSS-REFERENCE TO RELATED APPLICATIONS

This application claims the benefit of U.S. Provisional Application No. 61/139,348 filed on Dec. 19, 2008, which is hereby incorporated in its entirety herein by reference.

FIELD

The invention relates generally to a clutching method and mechanism for electrically variable transmissions, and more particularly to a clutching method and mechanism for electrically variable transmissions having a stationary release mechanism.

BACKGROUND

The statements in this section merely provide background information related to the present disclosure and may or may not constitute prior art.

A typical multiple speed automatic transmission uses a combination of friction clutches and brakes, planetary gear arrangements and fixed interconnections to achieve a plurality of gear ratios. The number and physical arrangement of the clutches and brakes, generally, are dictated by packaging, cost and desired speed ratios.

While current automatic transmissions achieve their intended purpose, the need for new and improved clutch and brake configurations which exhibit improved performance, especially from the standpoints of efficiency, responsiveness and smoothness and improved packaging, primarily reduced size and weight, is essential. For example, there is a constant desire to reduce spin losses in rotating clutches within electrically variable automatic transmissions. Accordingly, there is a need for an improved, cost-effective, compact electrically variable transmission having multiple power-split modes of operation and reduced spin losses during clutch actuation.

SUMMARY

A transmission is provided having an input member, an output member, two planetary gear sets, two electric motors, a plurality of coupling members and a plurality of torque transmitting devices. Each of the planetary gear sets includes first, second and third members. The torque transmitting devices include a rotating clutch and a brake. The rotating clutch and the brake share a common fixed connection. The rotating clutch is released by a stationary actuator that engages a rotatable release plate and is applied by an apply spring. The actuator is engaged to release the rotating clutch when the brake is engaged.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 4 is a truth table presenting the state of engagement of the various torque transmitting devices in each of the available ranges of the electrically variable transmission illustrated in FIGS. 1-3.

DETAILED DESCRIPTION

The following description is merely exemplary in nature and is not intended to limit the present disclosure, application, or uses.

Figure 1:
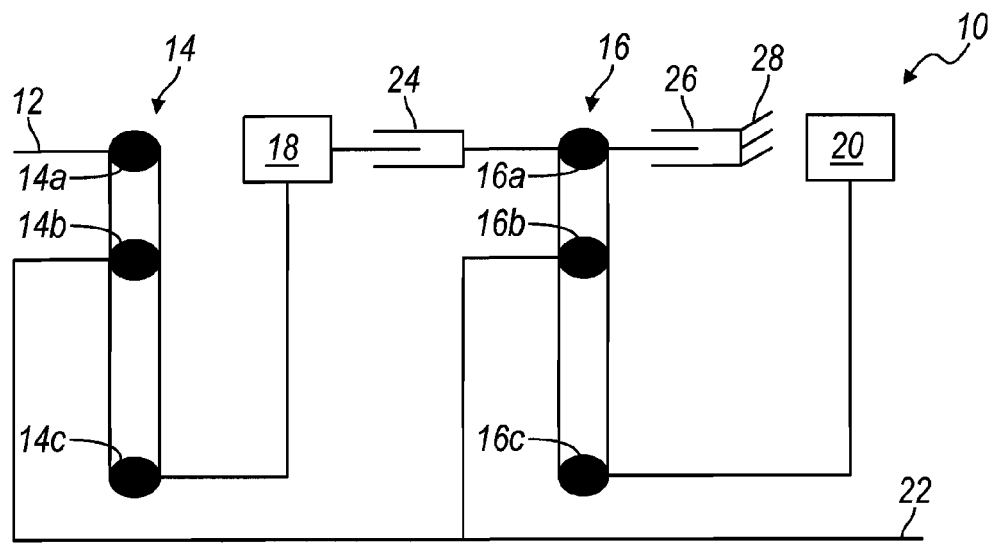
FIG. 1 is a lever diagram of an embodiment of an electrically variable transmission according to the principles of the present invention.

Referring now to FIG. 1, an embodiment of an electrically variable transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear member, one for the planet gear carrier member, and one for the ring gear member. The relative length between the nodes of each lever can be used to represent the ring-to-sun ratio of each respective gearset. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded.

The electrically variable transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a first motor or generator 18, a second motor or generator 20, and an output shaft or member 22. The third node 14C of the first planetary gear set 14 is coupled to the first motor 18. The third node 16C of the second planetary gear set 16 is coupled to the second motor 20. The input member 12 is coupled to the first node 14A of the first planetary gear set 14. The output member 22 is coupled to the second node 14B of the first planetary gear set 14 and to the second node 16B of the second planetary gear set 16.

A first torque transmitting device, or clutch, 24 selectively connects the first motor 18 to the first node 16A of the second planetary gear set 16. A second torque transmitting device, or brake, 26 selectively connects the first node 16A of the second planetary gear set 16 to a ground, stationary member, or transmission housing 28.

Figure 2:
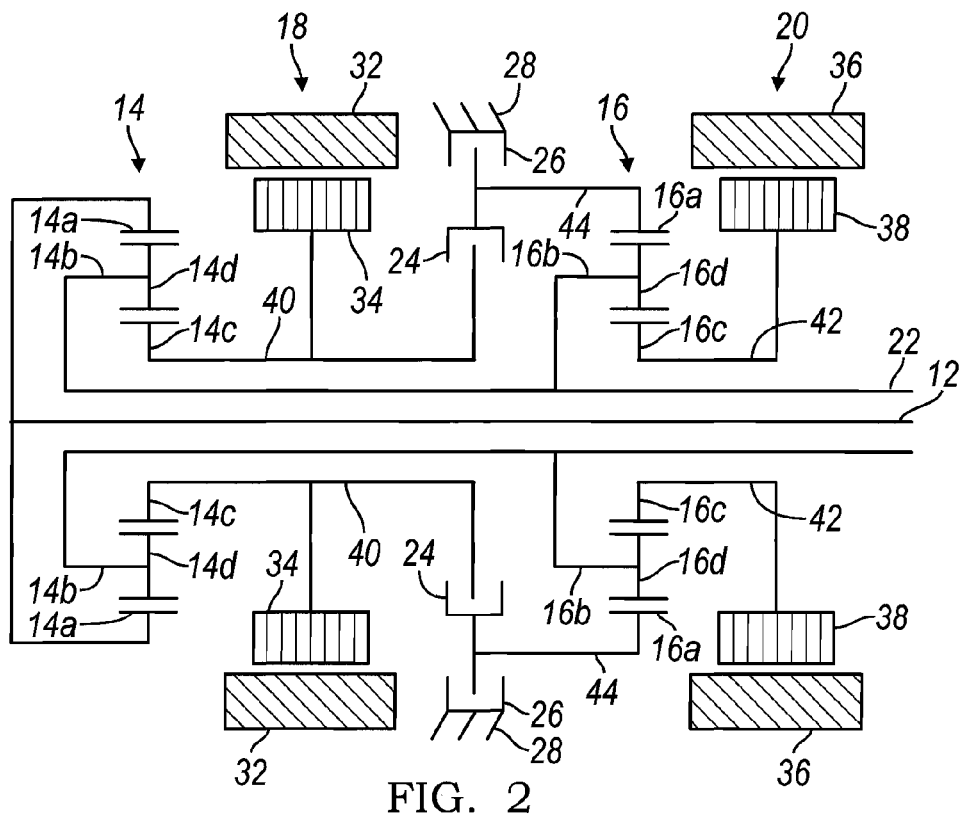
FIG. 2 is a diagrammatic view of the electrically variable transmission according to the principles of the present invention.

Referring now to FIG. 2, a stick diagram presents a schematic layout of the embodiment of the electrically variable transmission 10 according to the present invention. In FIG. 2, the numbering from the lever diagram of FIG. 1 is carried over. The clutches, brakes, motors, and couplings are correspondingly presented whereas the nodes of the planetary gear sets now appear as components of planetary gear sets such as sun gear members, ring gear members, planet gears and planet gear carrier members. More specifically, the first planetary gear set 14 includes a sun gear member 14C, a ring gear member 14A, and a planet carrier member 14B that includes a plurality of planet gears 14D rotatably disposed thereon. The planet gears 14D are each intermeshed with both the sun gear member 14C and the ring gear member 14A.

The second planetary gear set 16 includes a sun gear member 16C, a ring gear member 16A, and a planet carrier member 16B that includes a plurality of planet gears 16D rotatably disposed thereon. The planet gears 16D are each intermeshed with both the sun gear member 14C and the ring gear member 16A.

The first motor 18 may take various forms without departing from the scope of the present invention and generally includes a stator 32 and a rotor 34. The stator 32 is secured to a ground, stationary member, or the transmission housing 28. Likewise, the second motor 20 may take various forms without departing from the scope of the present invention and generally includes a stator 36 and a rotor 38. The stator 36 is secured to a ground, stationary member, or the transmission housing 28.

The input shaft 12 is coupled to and directly drives the ring gear member 14A of the first planetary gear set 14. A first shaft or interconnecting member 40 couples the sun gear member 14C of the first planetary gear set 14 with the rotor 34 of the first motor 18 and with the first torque transmitting device 24. A second shaft or interconnecting member 42 couples the sun gear member 16C of the second planetary gear set 16 to the rotor 38 of the second motor 20. to the second sun gear member 16B. A third shaft or interconnecting member 44 couples the ring gear member 16A of the second planetary gear set 16 to the first torque transmitting device 24 and the second torque transmitting device 26. The output member 22 is coupled to the carrier member 14B of the first planetary gear set 14 and to the carrier member 16B of the second planetary gear set 16.

The first torque transmitting device 24 selectively couples the first interconnecting member 40 to the third interconnecting member 44 in order to cause the ring gear member 16B of the second planetary gear set 16 to rotate with the rotor 34 of the first motor 18 and the sun gear 14C of the first planetary gear set 14. The second torque transmitting device 26 selectively couples the third interconnecting member 44 to a ground, stationary member, or the transmission housing 28 in order to restrict rotation of the ring gear member 16B of the second planetary gear set 16.

Figure 3:
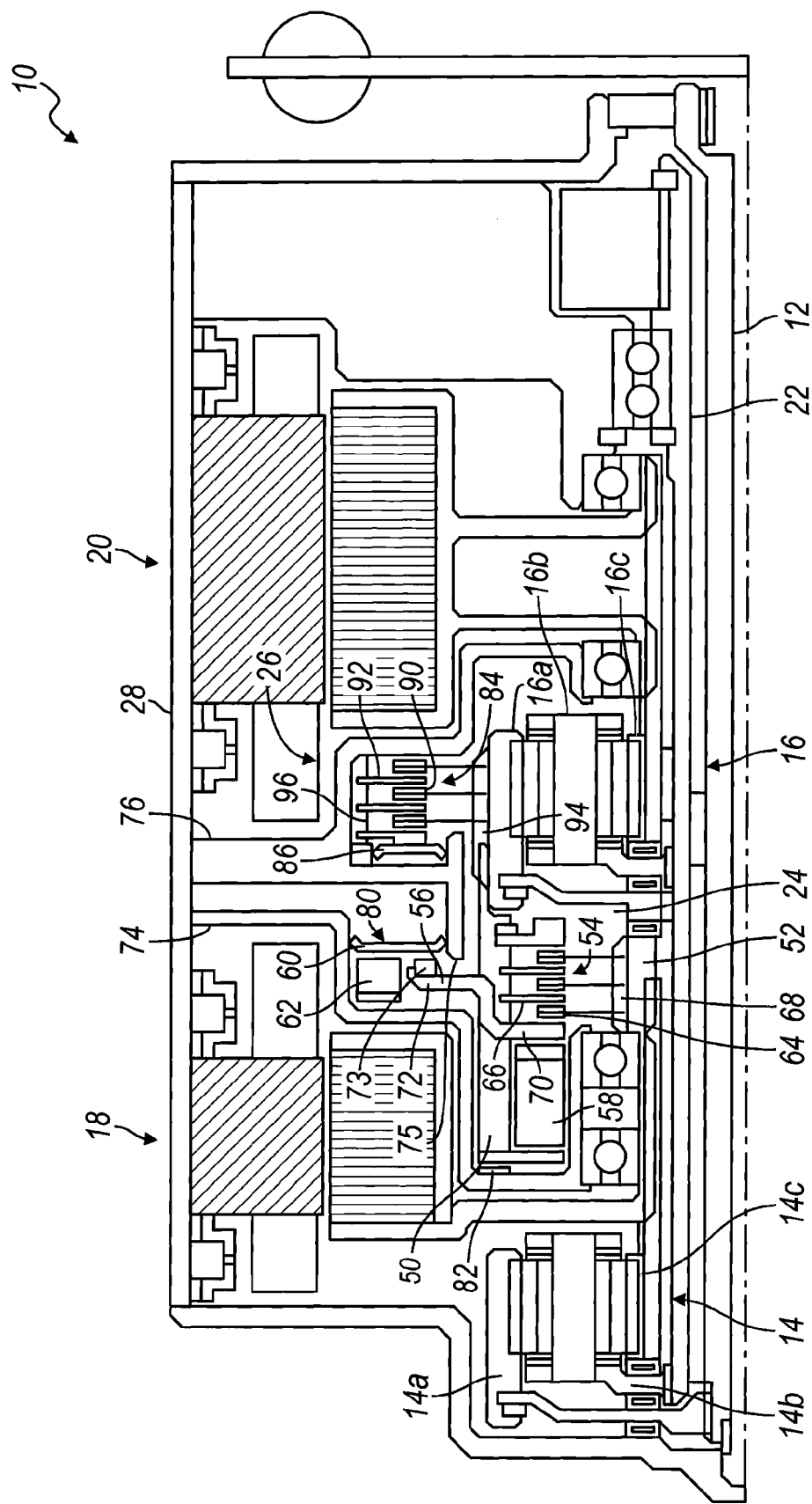
FIG. 3 is a partial cross-sectional view of the electrically variable transmission according to the principles of the present invention.

With reference to FIG. 3, a cross-sectional view of the electrically variable transmission 10 is shown wherein the numbering from the stick diagram of FIG. 2 is carried over. The first torque transmitting device 24 is preferably a spring applied, normally closed, rotating clutch with a stationary piston actuator. More specifically, the first torque transmitting device 24 includes a drum or housing 50, a hub 52, a clutch pack 54, a release plate 56, an apply spring 58, an actuator 60, and a release spring 62. The housing 50 is preferably cylindrical and is rotatingly coupled to the ring gear member 16A of the second planetary gear set 16. The hub 52 is located radially inward of the housing 50 and is rotatingly coupled to the sun gear member 14C of the first planetary gear set 14 and to the first motor 18. The hub 52 and housing 50 are rotatable with respect to one another.

The clutch pack 54 is located within the housing 50 and includes a set of friction discs 64 interleaved with a set of reaction discs 66. The discs 66, 64 may take various forms, such as, for example, opposing steel discs and fiber faced discs. The friction discs 64 include an inner radial surface coupled to a spline 68 located on an outer surface of the hub 52. The friction discs 64 are rotatably coupled to the hub 52.

The reaction discs 66 include an outer radial surface coupled to an inner surface of the housing 50. The reaction discs 66 are rotatingly coupled to the housing 50. However, the discs 64, 66 are moveable in an axial direction relative to the housing 50 and the hub 52, as will be described in greater detail below. It should be appreciated that the friction discs 64 and the reaction discs 66 may be interchanged without departing from the scope of the present invention.

The release plate 56 is slidably disposed within the housing 50 and includes a first end 70 opposite a second end 72. The first end 70 is located within the housing 50 proximate the clutch pack 54. The second end 72 is located radially outward from the housing 50. A release bearing 73 is coupled to the second end 72. The release bearing 73 may take various forms without departing from the scope of the present invention and allows rotation on opposite sides of the release bearing 73 as is known in the art. The second end 72 extends radially through an aperture or opening 75 located between a first wall 74 and a second wall 76. The walls 74, 76 are preferably connected to the transmission housing 28 and are, accordingly, stationary (i.e. do not rotate).

The apply spring 58 is located within the housing 50 axially between the housing 50 and the release plate 56. The apply spring 58 may be any kind of biasing member without departing from the scope of the present invention. The apply spring 58 exerts a spring force on the release plate 56 and urges the release plate 56 towards the clutch pack 54.

The actuator 60 is preferably a hydraulically actuated piston and is slidably disposed between the first wall 74 and the second wall 76. Accordingly, the actuator 60 does not rotate with other components of the first torque transmitting device 24.

The release spring 62 is located axially between the first wall 74 and the actuator 60. The release spring 62 may be any kind of biasing member without departing from the scope of the present invention. The release spring 62 exerts a spring force on the actuator 60 and urges the actuator 60 towards the second wall 76.

The operation of the first torque transmitting device 24 will now be described in detail. When the torque transmitting device 24 is in the unengaged or released condition, torque is not transmitted between the housing 50 and the hub 52 through the clutch pack 54. More specifically, a pressurized hydraulic fluid is introduced on an apply side 80 of the actuator 60. The hydraulic fluid moves the actuator 60 in an axial direction towards the first wall 74 and towards the release plate 56 against the biasing force of the release spring 62. The actuator 60 engages the release plate 56 through the release bearing 73 and moves the release plate 56 in an axial direction towards the apply spring 58. The apply spring 58 is compressed against a reaction bearing 82 located between the housing 50 and a portion of the first wall 74. Accordingly, the first end 70 of the release plate 56 disengages or does not contact the clutch pack 54 and therefore the discs 64, 66 do not couple or engage one another with sufficient force to transmit torque therebetween.

When the torque transmitting device 24 is in the engaged or applied condition, torque is transmitted between the housing 50 and the hub 52 through the clutch pack 54. More specifically, the actuator 60 is not hydraulically actuated and the release spring 62 urges the actuator 60 away from the release plate 56 such that the actuator 62 does not engage or contact the release plate 56. The apply spring 58 in turn urges the release plate 56 towards the clutch pack 54 and the release plate 56 engages the clutch pack 54. In the applied or engaged position, the release plate 56 engages the clutch pack 16 and forces the discs 64, 66 to move axially and frictionally engage one another. Accordingly, torque is transmitted between the housing 50 and the hub 52 through the clutch pack 54.

The second torque transmitting device 26 is preferably a brake that includes a clutch pack 84 that is hydraulically actuated by an actuator 86. The clutch pack 84 is located within a cavity 88 formed in the second wall 76. The clutch pack 84 includes a set of friction discs 90 interleaved with a set of reaction discs 92. The discs 92, 90 may take various forms, such as, for example, opposing steel discs and fiber faced discs. The friction discs 90 include an inner radial surface coupled to a spline 94 located on the ring gear member 16A of the second planetary gear set 16. The friction discs 90 are rotatingly coupled to the ring gear member 16A of the second planetary gear set 16. The reaction discs 92 include an outer radial surface coupled to a spline 96 on an inner surface of the second wall 76. The reaction discs 92 are rotatingly coupled to the second wall 76 and are therefore prevented from rotating. However, the discs 90, 92 are moveable in an axial direction relative to the second wall 76, as will be described in greater detail below. It should be appreciated that the friction discs 90 and the reaction discs 92 may be interchanged without departing from the scope of the present invention.

The actuator 86 is preferably a hydraulically actuated piston and is slidably disposed between the second wall 76 and the clutch pack 84. The actuator 86 is moveable to selectively engage the clutch pack 84. When the torque transmitting device 26 is in the unengaged or released condition, torque is not transmitted from the ring gear member 16A to the second wall 76 through the clutch pack 84. Accordingly, the actuator 86 disengages or does not contact the clutch pack 84 and therefore the discs 90, 92 do not couple or engage one another with sufficient force to transmit torque therebetween.

When the torque transmitting device 26 is in the engaged or applied condition, torque is transmitted from the ring gear member 16A to the second wall 76 through the clutch pack 84, i.e., the ring gear member 16A is held stationary. More specifically, a pressurized hydraulic fluid contacts the actuator 86 and moves the actuator 86 in an axial direction towards the clutch pack 84. Accordingly, the actuator 86 engages and contacts the clutch pack 84 and therefore the discs 90, 92 couple or engage one another with sufficient force to transmit torque therebetween.

Referring now to FIG. 4 and with continued reference to FIGS. 1-3, the operation of the embodiment of the electrically variable transmission 10 will be described. The transmission 10 is operable to provide at least four operating selections or ranges. For example, to establish a low, M1 selection, which is an input-power-split mode of operation wherein the speed ratio of the transmission can be varied by controlling the speed of the first motor 18, the first torque transmitting device 24 is disengaged and the second torque transmitting device 26 is engaged. In this condition, there is an axial force on the release bearing 73 and the release plate 56 due to actuation of the actuator 60, however, the ring gear member 16A and therefore the housing 50 and release plate 56 are held stationary by the second torque transmitting device 26. Accordingly, the release plate 56 and the release bearing 73 have no speed and no spin loss.

To establish a fixed gear selection, the first torque transmitting device 24 is engaged and the second torque transmitting device 26 is engaged. In this condition, there is no axial force on the release bearing 73 and the release plate 56 because the actuator 60 is not engaged with the release plate 56. In addition, the ring gear member 16A and therefore the housing 50 and release plate 56 are held stationary by the second torque transmitting device 26. Accordingly, the release plate 56 and the release bearing 73 have no speed and no spin loss.

To establish a high, M2 selection, which is a compound-power-split mode of operation wherein the speed ratio through the transmission can be varied by controlling the speed of either motor 18 or 20, the first torque transmitting device 24 is engaged and the second torque transmitting device 26 is disengaged. In this condition, there is no axial force on the release bearing 73 and the release plate 56 because the actuator 60 is not engaged with the release plate 56. However, the ring gear member 16A is not held stationary by the second torque transmitting device 26 and therefore the housing 50 and release plate 56 are rotatable. Accordingly, the release plate 56 and the release bearing 73 have speed but do not have spin loss since there is no axial force on the release bearing 73 or the release plate 56.

Finally, to establish an "eTC" shift selection, which is a so-called "electric torque converter" transition between the M1 mode and the M2 mode, the first torque transmitting device 24 is disengaged and the second torque transmitting device 26 is disengaged. In this condition, there is an axial force on the release bearing 73 and the release plate 56 due to actuation of the actuator 60. However, the ring gear member 16A is not held stationary by the second torque transmitting device 26 and therefore the housing 50 and release plate 56 are rotatable. Accordingly, the release plate 56 and the release bearing 73 have speed and have spin loss since there is an axial force on the release bearing 73 or the release plate 56 during rotation.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
    a transmission case;
    a plurality of planetary gear sets disposed within the transmission case, each including a first member, a second member, and a third member;
    a clutch comprising:
        the first connecting member coupled to a first member of one of the plurality of planetary gear sets;
        a second connecting member coupled to the second member of one of the plurality of planetary gear sets;
        a biasing member disposed to rotate with the second connecting member and operable to join the first and second connecting members for common rotation; and
        a piston disposed within the transmission case, the piston actuatable by a fluid and operable to oppose the action of the biasing member and release the first connecting member from the second connecting member for separate rotation; and
    a brake operable to prevent rotation of the second connecting member and the biasing member.

2. The transmission of claim 1 wherein the first connecting member comprises one of a friction plate and a reaction plate and the second member comprises one of a friction plate and a reaction plate.

3. The transmission of claim 1 wherein the piston is rotationally coupled to the transmission case.

4. The transmission of claim 1 wherein the transmission case includes a first wall and a second wall, and wherein the piston of the clutch is slidably disposed between the first wall and the second wall.

5. The transmission of claim 4 wherein the first wall and the second wall define an opening, and the clutch further includes a release plate at least partially disposed within the opening, wherein the release plate joins for common sliding motion a first end of the biasing member, the piston of the clutch, and the second connecting member.

6. The transmission of claim 5 wherein the release plate includes a first end and a second end, and wherein the first end is disposed adjacent the piston between the first wall and the second wall, and the second end is disposed within the housing between the biasing member and the second connecting member of the clutch.

7. The transmission of claim 6 further comprising a bearing element disposed on the first end of the release plate, the bearing element disposed between the first end and the piston.

8. The transmission of claim 7 further comprising a release spring disposed between the first wall and the piston, the release spring operable to move the piston away from the bearing element.

9. The transmission of claim 8 wherein the piston includes a first side and a second side, and wherein the hydraulic fluid contacts the piston on the first side and the release spring contacts the piston on the second side.

10. The transmission of claim 1, further comprising a first electric motor, wherein the first electric motor is connected for common rotation with the first member of one of the plurality of planetary gear sets.

11. The transmission of claim 1, further comprising first and second electric motors, wherein the operation of the brake configures the transmission for operation in a first power-split mode of operation and the operation of the clutch configures the transmission for operation in a second power-split mode of operation.

12. The transmission of claim 1 wherein the first members of the plurality of planetary gear sets are sun gear members, the second members of the plurality of planetary gear sets are ring gear members, and the third members of the plurality of planetary gear sets are carrier members.

13. An electrically variable transmission comprising:
a transmission case;
a plurality of gear sets disposed within the transmission case;
a first interconnecting member connected to the plurality of gear sets;
a second interconnecting member connected to the plurality of gear sets;
a clutch comprising:
 a housing connected to the first interconnecting member;
 a hub connected to the second interconnecting member;
 a clutch pack connected to the housing and to the hub, the clutch pack engageable to connect the housing with the hub;
 a release plate in contact with the clutch pack, the release plate moveable between a first position and a second position, wherein the release plate engages the clutch pack to couple the housing with the hub when the release plate is in the first position and wherein the release plate does not engage the clutch pack when the release plate is in the second position, and wherein the release plate is rotationally fixed relative to the housing;
 a spring disposed between the housing and the release plate, the spring operable to move the release plate to the first position; and
 a piston disposed between the release plate and the transmission case, the piston actuatable by a hydraulic fluid, wherein the piston moves the release plate to the second position when the piston is actuated by the hydraulic fluid, and wherein the piston is rotationally fixed relative to the transmission case; and
a brake interconnected to the transmission case and to the hub of the clutch, wherein engagement of the brake connects the transmission case with the hub of the clutch.

14. The electrically variable transmission of claim 13 wherein the transmission case includes a first wall and a second wall, and wherein the piston of the clutch is slidably disposed between the first wall and the second wall.

15. The electrically variable transmission of claim 14 wherein the first wall and the second wall define an opening, and the release plate is at least partially disposed within the opening.

16. The electrically variable transmission of claim 15 wherein the release plate includes a first end and a second end, and wherein the first end is disposed adjacent the piston between the first wall and the second wall, and the second end is disposed within the housing between the spring and the clutch pack.

17. The electrically variable transmission of claim 16 further comprising a bearing element disposed on the first end of the release plate, the bearing element disposed between the first end and the piston.

18. The electrically variable transmission of claim 16 further comprising a release spring disposed between the first wall and the piston, the release spring operable to move the piston to the second position.

19. The electrically variable transmission of claim 18 wherein the piston includes a first side and a second side, and wherein the hydraulic fluid contacts the piston on the first side and the release spring contacts the piston on the second side.

20. The electrically variable transmission of claim 13 wherein the housing and the hub are rotatable with respect to the transmission case.

21. The electrically variable transmission of claim 13 wherein the first interconnecting member is connected to a sun gear of a planetary gear set and to an electric motor.

22. The electrically variable transmission of claim 13 wherein the second interconnecting member is connected to a ring gear of a planetary gear set.

23. The electrically variable transmission of claim 13 further comprising a first motor and a second motor interconnected to the plurality of gear sets, and wherein the clutch is disengaged and the brake is engaged to achieve a first power-split mode of operation to produce a speed ratio through the transmission that can be varied by controlling the speed of first motor, wherein the clutch is engaged and the brake is engaged to achieve a fixed gear mode of operation, wherein the brake is disengaged and the clutch is engaged to achieve a second power-split mode of operation to produce a speed ratio through the transmission that can be varied by controlling the speed of first motor or the second motor, and the clutch is disengaged and the brake is disengaged to achieve an transition speed ratio between the first and second power-split modes of operation.

* * * * *